United States Patent
Krauss et al.

(10) Patent No.: US 8,989,772 B2
(45) Date of Patent: Mar. 24, 2015

(54) METHODS AND APPARATUS FOR ESTIMATING TIME OF ARRIVAL INFORMATION ASSOCIATED WITH A WIRELESS SIGNAL

(71) Applicant: Motorola Mobility LLC, Libertyville, IL (US)

(72) Inventors: Thomas P Krauss, Algonquin, IL (US); Michael J Carney, Libertyville, IL (US); Anthony R Schooler, Bartlett, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 152 days.

(21) Appl. No.: 13/689,973

(22) Filed: Nov. 30, 2012

(65) Prior Publication Data

US 2014/0155082 A1    Jun. 5, 2014

(51) Int. Cl.
*H04W 24/00* (2009.01)
*H04W 24/02* (2009.01)
*G01S 19/22* (2010.01)
*G01S 5/02* (2010.01)
(Continued)

(52) U.S. Cl.
CPC ............... *H04W 24/02* (2013.01); *G01S 19/22* (2013.01); *G01S 5/0215* (2013.01); *G01S 5/0221* (2013.01); *G01S 5/0273* (2013.01); *G01S 5/10* (2013.01); *G01S 5/14* (2013.01)
USPC .................................................... 455/456.1

(58) Field of Classification Search
CPC ............ G01S 5/14; G01S 19/22; G01S 19/48; G01S 2013/466; G01S 5/0215; H04W 64/00
USPC ................................... 455/456.1–456.6
See application file for complete search history.

(56) References Cited

U.S. PATENT DOCUMENTS

| | | | | |
|---|---|---|---|---|
| 5,266,953 A | * | 11/1993 | Kelly et al. | 342/47 |
| 6,031,881 A | * | 2/2000 | Weill et al. | 375/341 |
| 6,493,380 B1 | | 12/2002 | Wu et al. | |

(Continued)

FOREIGN PATENT DOCUMENTS

WO    2009143559 A1    12/2009

OTHER PUBLICATIONS

Patent Cooperation Treaty, International Search Report and Written Opinion of the International Searching Authority for International Application No. PCT/US2013/068631, Feb. 28, 2014, 12 pages.

*Primary Examiner* — Nathan Mitchell
(74) *Attorney, Agent, or Firm* — Faegre Baker Daniels LLP

(57) ABSTRACT

Methods and apparatus for estimating time of arrival information associated with a wireless signal are disclosed. In an embodiment, a wireless device (102), or any other suitable device or system, determines a channel type based on multiple occurrences of a reference signal (700) (e.g., determine if a channel is delay-spread or non-delay-spread based on a ratio of largest peak to a mean of other peaks). The wireless device (102) then selects a time of arrival generator (800 or 900) based on the channel type (e.g., use delay-spread estimator if ratio is below threshold, and use non-delay-spread estimator if ratio is above threshold). The wireless device then (102) estimates the time of arrival information using the selected time of arrival generator (800 or 900) (e.g., sum peaks from multiple occasions and then estimate for delay-spread or estimate the time of arrival from each occasion and then average for non-delay-spread).

17 Claims, 7 Drawing Sheets

(51) Int. Cl.
*G01S 5/10* (2006.01)
*G01S 5/14* (2006.01)

(56) References Cited

U.S. PATENT DOCUMENTS

| | | | |
|---|---|---|---|
| 6,675,018 | B2 | 1/2004 | Villier et al. |
| 6,683,568 | B1 * | 1/2004 | James et al. ............... 342/387 |
| 7,099,640 | B2 | 8/2006 | Diao et al. |
| 7,221,913 | B2 | 5/2007 | Golden et al. |
| 7,593,742 | B2 | 9/2009 | Bohnhoff |
| 8,620,346 | B2 * | 12/2013 | Gaal ............ 455/456.1 |
| 8,694,022 | B2 * | 4/2014 | Khushu ............ 455/456.1 |
| 2004/0043726 | A1 | 3/2004 | Rowitch |
| 2007/0184783 | A1 * | 8/2007 | Rosenfeld ............ 455/67.11 |
| 2008/0032709 | A1 * | 2/2008 | Guvenc et al. ............ 455/456.2 |
| 2008/0130794 | A1 * | 6/2008 | Chong et al. ............ 375/317 |
| 2010/0279707 | A1 | 11/2010 | Fischer et al. |
| 2011/0183689 | A1 * | 7/2011 | Kim et al. ............ 455/456.1 |
| 2013/0260798 | A1 * | 10/2013 | Moshfeghi ............ 455/456.5 |
| 2014/0004876 | A1 * | 1/2014 | Fuller et al. ............ 455/456.1 |
| 2014/0113652 | A1 * | 4/2014 | Maguire ............ 455/456.1 |

* cited by examiner

METHODS AND APPARATUS FOR ESTIMATING TIME OF ARRIVAL INFORMATION ASSOCIATED WITH A WIRELESS SIGNAL

TECHNICAL FIELD

The present disclosure relates in general to wireless signals, and, in particular, to methods and apparatus for estimating time of arrival information associated with a wireless signal.

BACKGROUND

Many applications for mobile devices benefit from knowing the approximate physical location of the mobile device. For example, a map application on a wireless phone may give driving directions to a specific location from the current location of the device. Often, these devices use more than one signal type to determine the approximate physical location of the device. For example, a cellular phone may use global positioning system (GPS) signals, WiFi signals, and/or cellular signals.

When a device uses wireless signals to estimate a location of the device, typically the device (or something communicating with the device) uses triangulation to determine the location. If the location of three or more things is known, and the distance from the device to each of those things is known, the location of the device may be determined. For example, if a cellular telephone knows the approximate distance to each of three base stations and the approximate location of each of those base stations, the cellular phone may determine its approximate location.

Typically, cellular phones determine the distance from a base station to the cellular phone by timing the arrival of a reference signal. However, wireless signals interact with things in the physical environment such as buildings. As a result, wireless signals typically travel over several different paths before arriving at the receiver. In other words, the receiver actually sees more than one version of the same signal, where the different versions vary in attenuation, delay, and phase (i.e., fading or delay-spread). As the physical environment between the transmitter and the receiver changes (e.g., the wireless device is moving), the amount of delay-spread varies.

Accordingly, time of arrival estimation techniques typically programmed into devices make certain assumptions about the amount of delay-spread that is likely to occur. However, if the time of arrival estimation technique assumes a delay-spread channel when the channel is not a delay-spread channel (or vice versa), the time of arrival estimation will be less accurate. This in turn causes the location estimation to be less accurate.

DETAILED DESCRIPTION OF EXEMPLARY EMBODIMENTS

Figure 1:
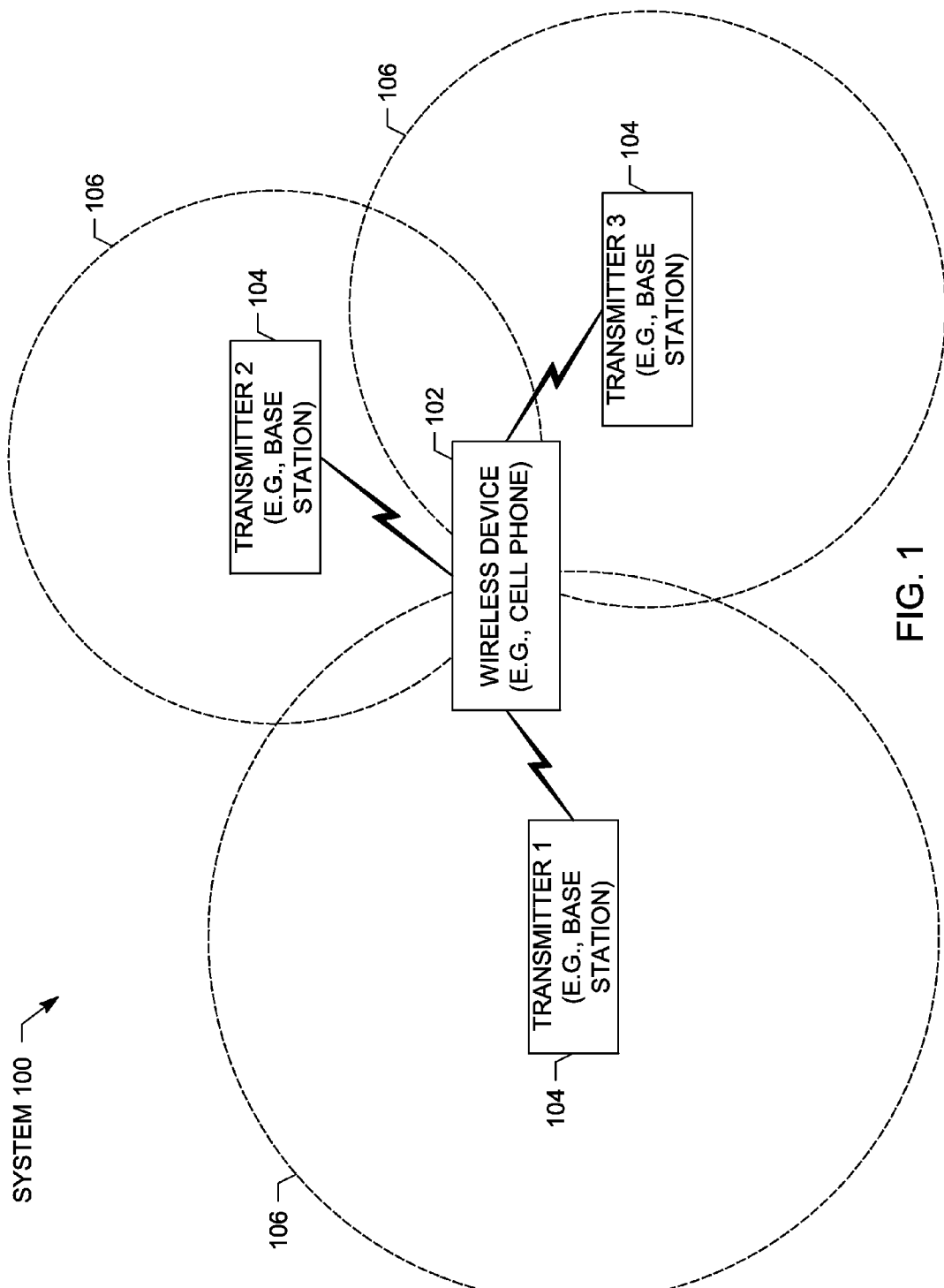
FIG. 1 is a block diagram of an example wireless network communication system.

Briefly, in a specific embodiment, a cellular phone receives multiple copies (e.g., four) of the same radio signal due to propagation reflections (e.g., the signal bouncing off buildings). The cellular phone determines if the radio channel being used by the cellular phone should be classified as a delay-spread channel (e.g., a fading channel due to a high degree of multipath propagation) or non-delay-spread channel (e.g., a non-fading channel do to a low degree of multipath propagation) by dividing the largest of the e.g. four peaks by the mean of other e.g. three peaks. If the result of dividing the largest of the e.g. four peaks by the mean of other e.g. three peaks, is below a certain threshold, the cellular phone classifies the channel as a delay-spread channel. As a result, the cellular phone estimates the time of arrival information by summing each of the e.g. four peaks at a time lag or index from one measurement occasion, with a corresponding peak at a common time lag or index in subsequent measurement occasions, then generates an estimate for a delay-spread channel. If the result of dividing the largest of the e.g. four peaks by the mean of other e.g. three peaks, is not below the certain threshold, the cellular phone classifies the channel as a non-delay-spread channel. As a result, the cellular phone estimates the time of arrival information by first estimating time of arrival for each individual occasion (e.g., each of four) and then averaging. As a result of this channel classification, the time of arrival estimation, and therefore the geographical location determination of the device, is more accurate.

More generally, methods and apparatus for estimating time of arrival information associated with a wireless signal are disclosed. In an embodiment, a wireless device, or any other suitable device or system, determines a channel type based on multiple occurrences of a reference signal. For example, the device determines if a channel is delay-spread or non-delay-spread based on a ratio of a largest peak to a mean of other peaks. The wireless device then selects a time of arrival estimation technique based on the channel type and estimates the time of arrival information using the selected estimation technique. In an example, the device sums peaks at a time lag or index from one measurement occasion, with a corresponding peak at a common time lag or index in subsequent measurement occasions, then generates an estimate for a delay-spread channel, and the device estimates the time of arrival from multiple measurement occasions and then average the estimates for a non-delay-spread channel.

Among other advantages, changing the time of arrival estimation technique as the channel type changes between delay-spread and non-delay-spread, allows for more accurate time of arrival estimations. Having more accurate time of arrival estimations results in more accurate approximation of the physical location of the mobile device.

In an embodiment, a radio frequency receiver is structured to receive a wireless signal (e.g., a cellular phone receiver). A controller (e.g., programmed CPU), operatively coupled to the radio frequency receiver, is structured to classify a channel type based on multiple occurrences of a reference signal (e.g., determine if channel is delay-spread or non-delay-spread based on ratio of largest peak to mean of other peaks). In addition, the controller is structured to select a time of arrival generator based on the channel type (e.g., use delay-spread estimator if ratio is below threshold, and use non-delay-spread estimator if ratio is above threshold) and estimate the time of arrival information using the selected time of arrival generator (e.g., sum peaks from multiple measurement occasions and then generate a time of arrival estimate for delay-spread, or estimate the time of arrival from multiple measurement occasions, and then average the estimates for non-delay-spread).

In one example, the controller is structured to classify a channel as one of (a) a delay-spread channel, and (b) a non-delay-spread channel. In one example, the controller is structured to determine a ratio of a first peak to a mean of a plurality of peaks, wherein the first peak is larger than each of the plurality of peaks. In one example, the plurality of peaks is determined by correlation of a received wireless signal with a reference signal. In one example, the ratio is a minimum ratio selected from a plurality of ratios. In one example, the controller is structured to select a first time of arrival generator if the ratio is not beyond a desired threshold. In one example, the controller is structured to sum each peak that occurs at a common time lag or index in the plurality of peaks from multiple occasions to form a multi-occasion correlation, and estimate the time of arrival information based on the multi-occasion correlation. In one example, the controller is structured to select a second time of arrival generator if the ratio is beyond a desired threshold. In one example, the controller is structured to estimate a plurality of individual time of arrival estimates, each corresponding to the plurality of peaks from one occasion, and estimate the time of arrival information based on the mean of the plurality of individual time of arrival estimates. In one example, the reference signal comprises a positioning reference symbol. In one example, a second controller is structured to triangulate a physical position associated with the apparatus based on the time of arrival information.

Turning now to the drawings, and as described in detail below, one example of the presently disclosed system is realized in a wireless network communications system, although any suitable communication system may be employed. A block diagram of an exemplary wireless network communications system 100 is illustrated in FIG. 1. The example system 100 includes one or more wireless devices 102 receiving signals from one or more transmitters 104. For example, the transmitters 104 may be cellular base stations, and the wireless device 102 may be a cellular phone and/or a portable computing device. Each of the transmitters 104 is a certain distance, represented as the radius of circle 106, from the wireless device 102. Each distance 106 can be determined by measuring the amount of time needed to transmit a signal from a transmitter 104 to the wireless device 102. If three or more of these distances 106 are known, the approximate position of the wireless device 102 may be determined using triangulation in a well known manner.

Figure 2:
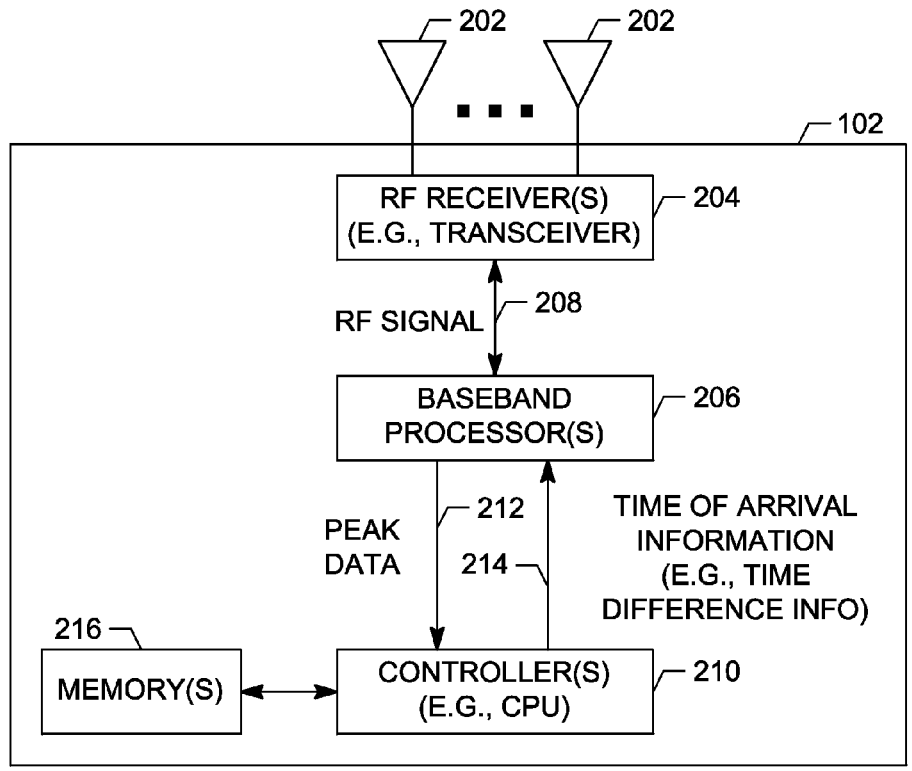
FIG. 2 is a block diagram of an example wireless device.

A block diagram of an example wireless device 102 for estimating time of arrival information associated with a wireless signal is illustrated in FIG. 2. The wireless device 102 may be implemented in hardware or a combination of hardware and hardware executing software. In one embodiment the wireless device 102 may be embodied in a CPU executing software. Other suitable hardware may include one or more application specific integrated circuits (ASICs), state machines, field programmable gate arrays (FPGAs), and/or digital signal processors (DSPs).

In this example, the wireless device 102 includes a plurality of antennas 202 operatively coupled to one or more radio frequency (RF) receivers 204. The receiver 204 is also operatively coupled to one or more baseband processors 206. The receiver 204 tunes to one or more radio frequencies to receive one or more radio signals 208, which are passed to the baseband processor 206 in a well known manner. The baseband processor 206 is operatively coupled to one or more controllers 210. The baseband processor 206 passes peak data 212 to the controller 210. The controller uses the peak data 212 from multiple occurrences of a reference symbol to determine time of arrival information 214. For example, the controller 210 may estimate the time of arrival for two or more different signals coming from two or more different base stations and then send the difference between these times to one of the base stations, multiple base stations, and/or any other suitable device or system. A memory 216 operatively coupled to the controller 210 may store the peak data 212, the time of arrival information 214, and/or any other suitable data.

Figure 3:
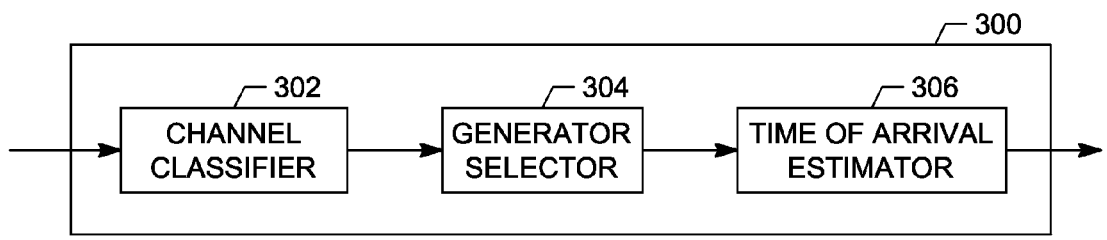
FIG. 3 is a block diagram of another example wireless device.

A block diagram of a device 300 for estimating time of arrival information associated with a wireless signal is illustrated in FIG. 3. The device 300 may be implemented in hardware (e.g., baseband processor 206) or a combination of hardware (e.g., baseband processor 206) and hardware executing software (e.g., controller 210). In one embodiment, the device 300 may be embodied in a CPU executing software. Other suitable hardware may include one or more application specific integrated circuits (ASICs), state machines, field programmable gate arrays (FPGAs), and/or digital signal processors (DSPs).

In this example, a channel classifier 302 classifies a channel type based on multiple occurrences of a reference signal (e.g., a positioning reference symbol or a sequence of reference symbols). For example, the channel classifier 302 may classify the channel type as (a) a delay-spread channel, or as (b) a non-delay-spread channel based on a ratio of a largest peak to a mean of a plurality of other peaks. The plurality of peaks may be determined by correlation of a received wireless signal with a reference signal. The ratio may be a minimum ratio selected from a plurality of ratios (e.g., smallest of four ratios).

The generator selector 304 selects a time of arrival generator based on the channel type. In an example, the generator selector 304 selects a first time of arrival generator if a ratio is below a desired threshold. In another example, the generator selector 304 selects a second different time of arrival generator if the ratio is not below the desired threshold.

The time of arrival estimator 306 estimates time of arrival information using the selected time of arrival generator. In an example, the time of arrival estimator 306 sums each peak at a time lag or index in one measurement occasion having a plurality of peaks, with a corresponding peak at a common time lag or index in subsequent measurement occasions, to form a multi-occasion correlation, and estimate the time of arrival based on the multi-occasion correlation. In another example, the time of arrival estimator 306 calculates a plurality of individual time of arrival estimates, each corresponding to a plurality of peaks from a single measurement occasion, and then estimates the time of arrival based on the mean of the plurality of individual time of arrival estimates.

Figure 4:
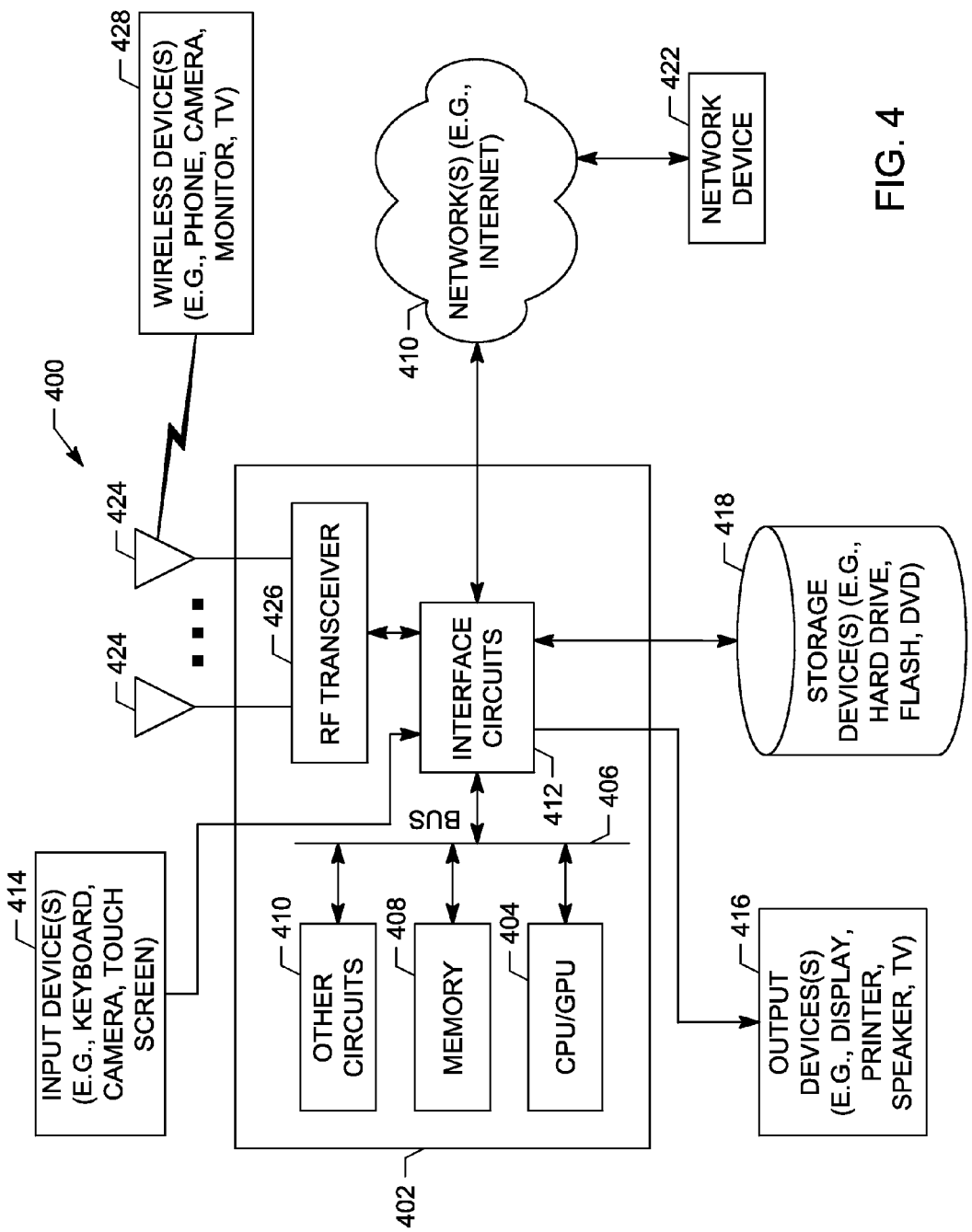
FIG. 4 is a block diagram of an example computing device that may be used to estimate time of arrival information associated with a wireless signal.

A block diagram of an example computing device 400 that may be used to estimate time of arrival information associated with a wireless signal is illustrated in FIG. 4. For example, the computing device 400 may be a base station, a cellular phone, and/or any other suitable device.

The example electrical device 400 includes a main unit 402 which may include, if desired, one or more processors 404 electrically coupled by an address/data bus 406 to one or more memories 408, other computer circuitry 410, and one or more interface circuits 412. The processor 404 may be any suitable processor or plurality of processors. In an example, at least a portion of the electrical device 400 includes a central processing unit (CPU) and/or a graphics processing unit (GPU). The memory 408 may include various types of non-transitory memory including volatile memory and/or non-volatile memory such as, but not limited to, distributed memory, read-only memory (ROM), random access memory (RAM) etc. The memory 408 typically stores a software program that interacts with the other devices in the system as described herein. This program may be executed by the processor 404 in any suitable manner. The memory 408 may also store digital data indicative of documents, files, programs, web pages, etc. retrieved from a server and/or loaded via an input device 414.

The interface circuit 412 may be implemented using any suitable interface standard, such as an Ethernet interface and/or a Universal Serial Bus (USB) interface. One or more input devices 414 may be connected to the interface circuit 412 for entering data and commands into the main unit 402. For example, the input device 414 may be a keyboard, mouse, touch screen, track pad, isopoint, camera and/or a voice recognition system.

One or more displays, printers, speakers, monitors, televisions, high definition televisions, and/or other suitable output devices 416 may also be connected to the main unit 402 via the interface circuit 412. The display 416 may be a cathode ray tube (CRTs), liquid crystal displays (LCDs), or any other type of suitable display. The display 416 generates visual displays of data generated during operation of the device 400. For example, the display 416 may be used to display web pages and/or other content received from a server. The visual displays may include prompts for human input, run time statistics, calculated values, data, etc.

One or more storage devices 418 may also be connected to the main unit 402 via the interface circuit 412. For example, a hard drive, CD drive, DVD drive, and/or other storage devices may be connected to the main unit 402. The storage devices 418 may store any type of data used by the device 400.

The electrical device 400 may also exchange data with other network devices 422 via a connection to a network. The network connection may be any type of network connection, such as an Ethernet connection, digital subscriber line (DSL), telephone line, coaxial cable, etc. Users of the system may be required to register with a server. In such an instance, each user may choose a user identifier (e.g., e-mail address) and a password which may be required for the activation of services. The user identifier and password may be passed across the network using encryption built into the user's browser. Alternatively, the user identifier and/or password may be assigned by the server.

In some embodiments, the device 400 may be a wireless device. In such an instance, the device 400 may include one or more antennas 424 connected to one or more radio frequency (RF) transceivers 426. The transceiver 426 may include one or more receivers and one or more transmitters. For example, the transceiver 426 may be a cellular transceiver. The transceiver 426 allows the device 400 to exchange signals, such as voice, video and data, with other wireless devices 428, such as a phone, camera, monitor, television, and/or high definition television. For example, the device may send and receive wireless telephone signals, text messages, audio signals and/or video signals.

Figure 5:
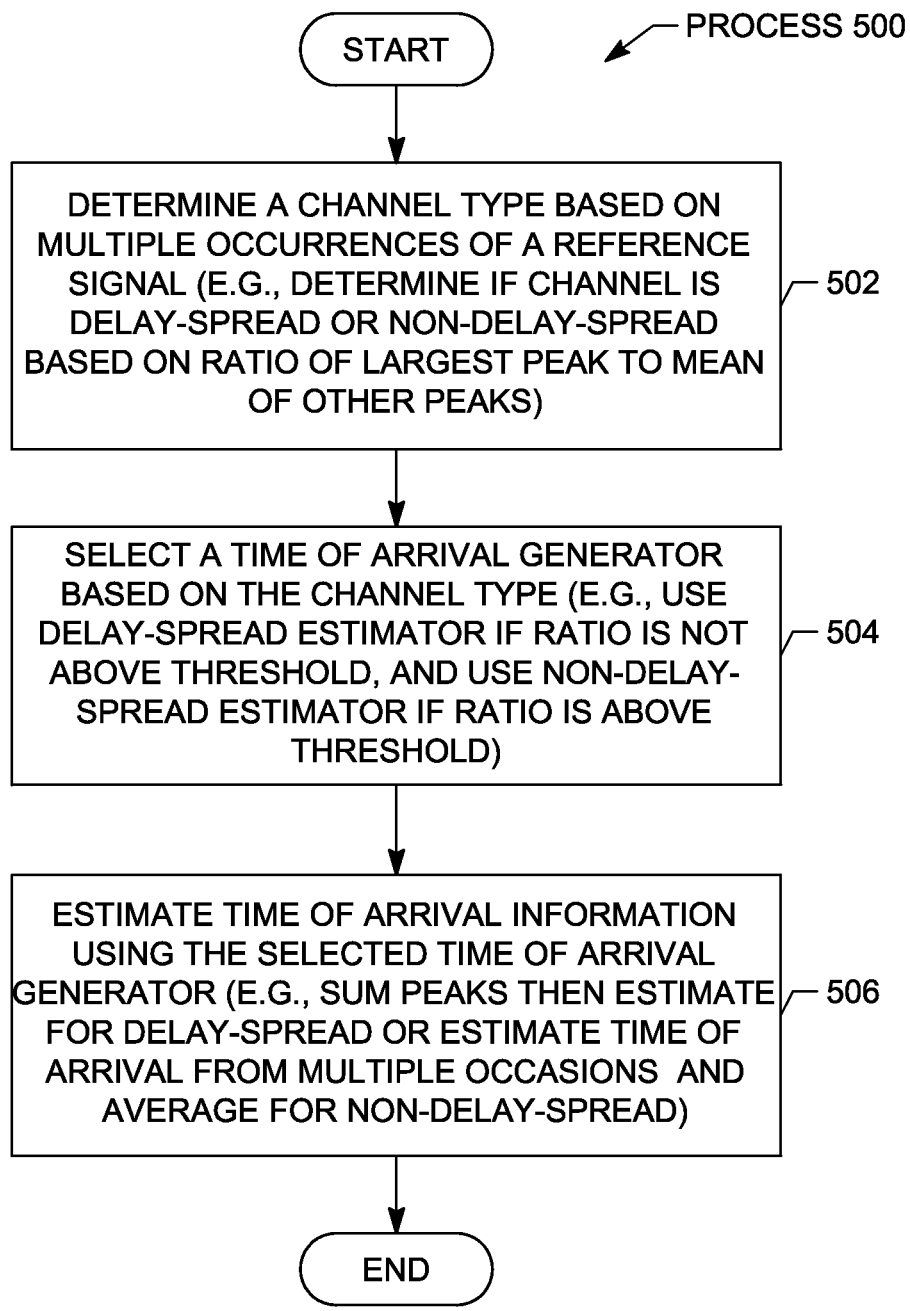
FIG. 5 is a flowchart of an example process for estimating time of arrival information associated with a wireless signal.

A flowchart of an example process 500 for estimating time of arrival information associated with a wireless signal is illustrated in FIG. 5. The process 500 may be carried out by one or more suitably programmed controllers or processors executing software (e.g., block 210 of FIG. 2 and/or block 404 of FIG. 4). The process 500 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In general, a wireless device 102, and/or any other suitable device or system, determines a channel type based on multiple occurrences of a reference signal. The wireless device 102 then selects a time of arrival generator based on the channel type and estimates the time of arrival information using the selected time of arrival generator.

More specifically, the example process 500 begins when a wireless device 102, and/or any other suitable device or system, determines a channel type based on multiple occurrences of a reference signal (block 502). In an example, the wireless device 102 classifies that the channel type is (a) a delay-spread channel or (b) a non-delay-spread channel by calculating a ratio of a largest peak to a mean of a plurality of other peaks in one or more positioning reference symbols and comparing the ratio to a threshold (See FIG. 7). In an embodiment, the plurality of peaks is determined by correlation of a received wireless signal with a reference signal.

The wireless device 102 then selects a time of arrival generator based on the channel type (block 504). In an example, the wireless device 102 selects a first time of arrival generator if the ratio is not above a desired threshold, and the wireless device 102 selects a second time of arrival generator if the ratio is above a desired threshold.

The wireless device 102 then estimates time of arrival information using the selected time of arrival generator (block 506). In an example, the wireless device 102 sums each peak at a common time lag or index in the plurality of peaks from multiple measurement occasions to form a multi-occasion correlation, and then estimates the time of arrival information based on the multi-occasion correlation (See FIG. 8). In another example, the wireless device 102 calculates a plurality of individual time of arrival estimates, each corresponding to a plurality of peaks from one measurement occasion, and then estimates the time of arrival information based on the mean of the plurality of individual time of arrival estimates (See FIG. 9).

Figure 6:
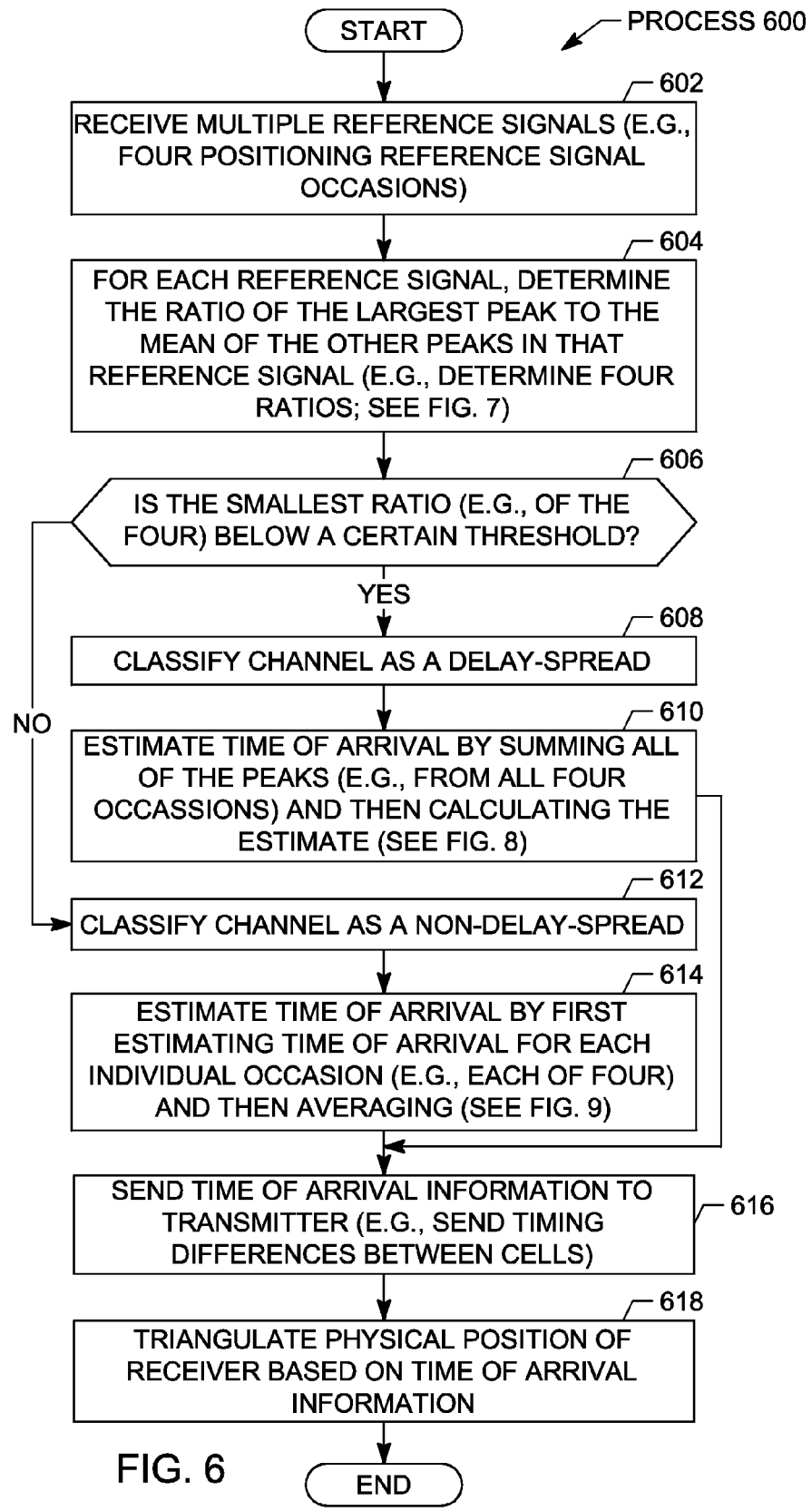
FIG. 6 is a flowchart of another example process for estimating time of arrival information associated with a wireless signal.

A flowchart of another example process 600 for estimating time of arrival information associated with a wireless signal is illustrated in FIG. 6. The process 600 may be carried out by one or more suitably programmed controllers or processors executing software (e.g., block 210 of FIG. 2 and/or block 404 of FIG. 4). The process 600 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6, it will be appreciated that many other methods of performing the acts associated with process 600 may be used. For example, the order of many of the operations may be changed, and some of the operations described may be optional.

In general, a wireless device 102, and/or any other suitable device or system, receives multiple reference signals and determines the ratio of the largest peak to the mean of the other peaks for each reference signal. If the smallest ratio is below a certain threshold, the wireless device 102 classifies the channel as a delay-spread channel and estimates the time of arrival by summing all of the peaks occurring at a common time lag or index and then calculating the estimate. If the smallest ratio is not below the threshold, the wireless device 102 classifies the channel as a non-delay-spread channel and estimates the time of arrival by first estimating a time of arrival for each measurement occasion and then averaging the time of arrival estimates. Once time of arrival estimates are known for multiple signals coming from multiple locations, the wireless device 102, and/or to any other suitable device or system may triangulate a physical position of the wireless device 102.

More specifically, the example process 600 begins when a wireless device 102, and/or any other suitable device or system, receives multiple reference signals (block 602). In an example, the wireless device 102 receives four positioning reference signals (see FIG. 7). For each reference signal, the wireless device 102 then determines the ratio of the largest peak to the mean of the other peaks in that reference signal measurement occasion (block 604). For example, the wireless device 102 may determine four such ratios (see FIG. 7).

If the smallest ratio (e.g., of the four ratios) is below a certain threshold (block 606), the wireless device 102 classifies the channel as a delay-spread channel (block 608). In this case, the wireless device 102 estimates the time of arrival by summing all of the peaks that occur at a common time lag or index from all measurement occasions (e.g., all four) and then calculating the estimate (block 610) (see FIG. 8).

If the smallest ratio (e.g., of the four ratios) is not below a certain threshold (block 606), the wireless device 102 classifies the channel as a non-delay-spread channel (block 612). In this case, the wireless device 102 estimates the time of arrival by first estimating a time of arrival for each individual measurement occasion (e.g., each of four) and then averaging the estimates (block 614) (see FIG. 9).

Once the time of arrival information is determined by one of the two methods based on the channel type, the time of arrival information may be sent to one of the transmitters that sent the reference symbol, and/or to any other suitable device or system (block 616). In an example, the wireless device 102 estimates the time of arrival for two or more different signals coming from two or more different base stations and then sends the difference between these times to one of the base stations, multiple base stations, and/or any other suitable device or system.

Once the time of arrival estimates are known for multiple signals coming from multiple locations, the wireless device 102, and/or to any other suitable device or system, may triangulate a physical position of the wireless device 102 based on the time of arrival information in a well known manner (block 618). In an example, the wireless device 102 determines time of arrival information for three different signals coming from three different base stations and uses that information to determine an approximate distance from each of the three base stations. The wireless device 102 and/or some other device with information indicative of the location of the three base stations, such as one or more of the base stations, may then determine an approximate physical location of the wireless device (See FIG. 1).

Figure 7:
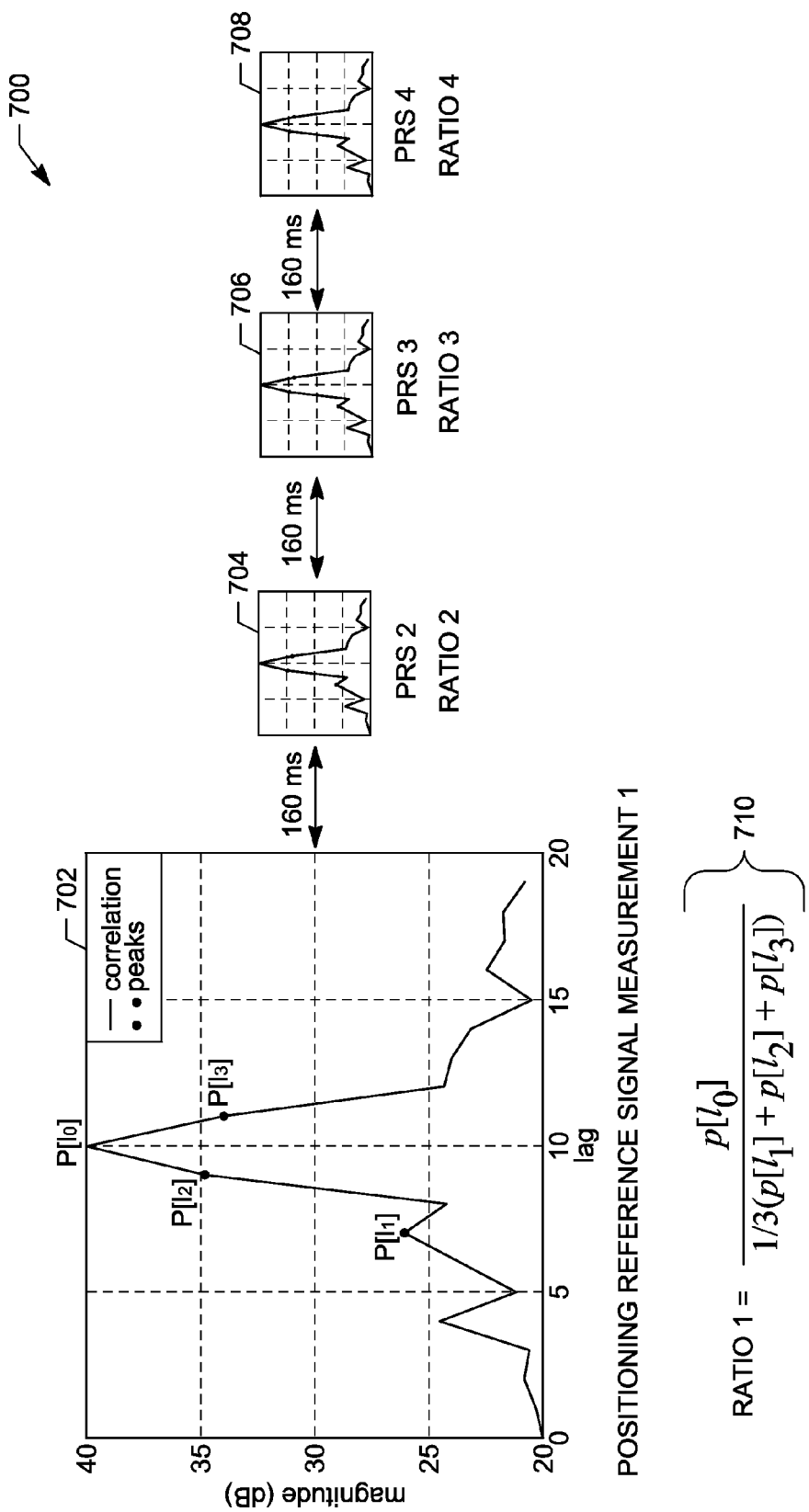
FIG. 7 is a waveform diagram showing a plurality of example positioning reference signal measurements.

A waveform diagram showing a plurality of example positioning reference symbols is illustrated in FIG. 7. In this example, four positioning reference signal measurement occasions (702, 704, 706, and 708) are shown. Each positioning reference signal measurement occasion in this example is separated by a common time offset of 160 milliseconds (ms). The first positioning reference symbol 702 is blown up to show additional detail. In this example, the positioning reference signal measurement occasion 702 has four peaks ($P[l_0]$, $P[l_1]$, $P[l_2]$, and $P[l_3]$), with each peak occurring at a unique time lag or index (e.g., $l_0$, $l_1$, $l_2$, and $l_3$). $P[l_0]$ is the largest peak, and $P[l_1]$, $P[l_2]$, and $P[l_3]$ are the smaller peaks. The example ratio 710 is determined by dividing the largest peak by the mean of the three smaller peaks. Once a ratio is determined for multiple occurrences (e.g., four) of the position reference signal, the smallest ratio may be used to classify the signal as delay-spread or non-delay-spread. In one embodiment, the time of arrival is estimated by summing all of the peaks (e.g., all four) that occur at a common time lag or index from all measurement occasions (e.g., all four) and then calculating the estimate. In this example, as many as sixteen peaks may be retained at the output of the summing operation, if no two peaks share a common time lag or index.

Figure 8:
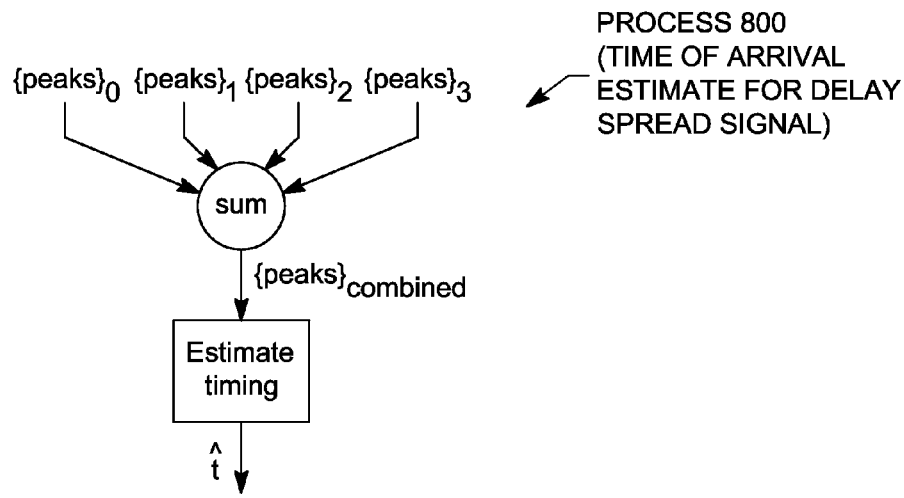
FIG. 8 is a flowchart of an example process for calculating a time of arrival estimate for a delay-spread signal.

A flowchart of an example process for calculating a time of arrival estimate for a delay-spread signal is illustrated in FIG. 8. In this example, the time of arrival is estimated by summing all of the peaks occurring at a common time lag or index from all measurement occasions (e.g., all four) and then calculating the estimate.

Figure 9:
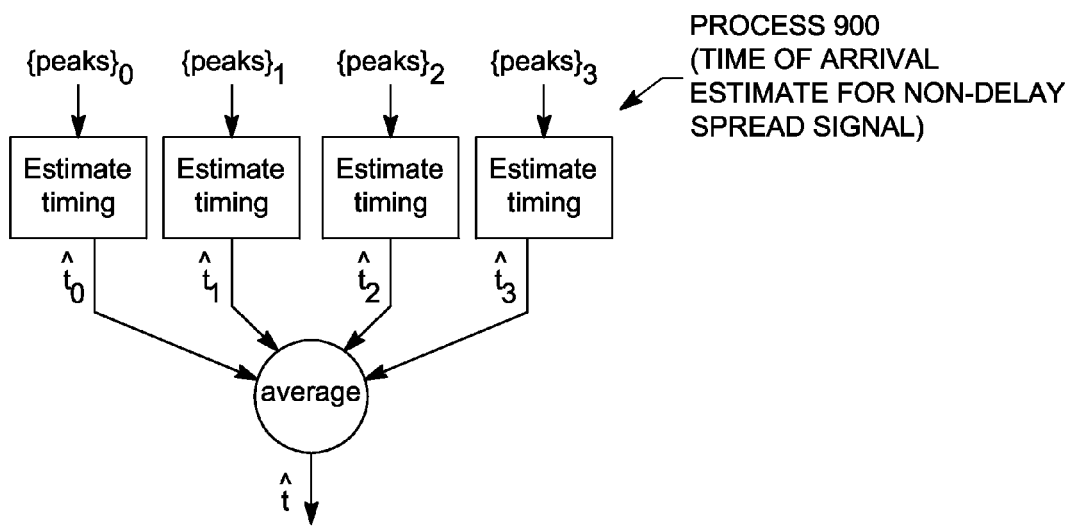
FIG. 9 is a flowchart of an example process for calculating a time of arrival estimate for a non-delay-spread signal.

A flowchart of an example process for calculating a time of arrival estimate for a non-delay-spread signal is illustrated in FIG. 9. In this example, the time of arrival is estimated by first estimating a time of arrival for each measurement occasion (e.g., each of four) and then averaging the time of arrival estimates.

In summary, persons of ordinary skill in the art will readily appreciate that methods and apparatus for estimating time of arrival information associated with a wireless signal have been provided. Among other advantages, changing the time of arrival estimation technique as the channel type changes between delay-spread and non-delay-spread, allows for more accurate time of arrival estimations. Having more accurate time of arrival estimations results in a more accurate approximation of the physical location of the mobile device.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of estimating time of arrival information associated with a wireless signal, the method comprising:
   receiving multiple occurrences of a reference signal;
   for each occurrence of the reference signal, determining a ratio of a largest peak to a mean of a plurality of other peaks;
   selecting a minimum ratio;
   based on the ratio, classifying a channel type as one of (a) a delay-spread channel type, and (b) a non-delay-spread channel type;
   selecting a time of arrival generator based on the channel type; and
   estimating the time of arrival information using the selected time of arrival generator.

2. The method of claim 1, wherein the plurality of other peaks is determined by correlation of the received wireless signal with the reference signal.

3. The method of claim 1, wherein selecting the time of arrival generator based on the channel type includes selecting a first time of arrival generator if the ratio is not beyond a desired threshold.

4. The method of claim 3, wherein estimating the time of arrival information using the selected time of arrival generator includes summing peaks from multiple occasions to form a multi-occasion correlation, and estimating the time of arrival information based on the multi-occasion correlation.

5. The method of claim 1, wherein selecting the time of arrival generator based on the channel type includes selecting a second time of arrival generator if the ratio is beyond a desired threshold.

6. The method of claim 5, wherein estimating the time of arrival information using the selected time of arrival generator includes estimating a plurality of individual time of arrival estimates, each corresponding to the plurality of peaks from a measurement occasion, and estimating the time of arrival information based on the mean of the plurality of individual time of arrival estimates.

7. The method of claim 1, wherein the reference signal comprises a positioning reference symbol.

8. The method of claim 1, further comprising triangulating a physical position of a wireless device based on the time of arrival information.

9. An apparatus for estimating time of arrival information associated with a wireless signal, the apparatus comprising:
- a radio frequency receiver structured to receive multiple occurrences of a reference signal; and
- a controller, operatively coupled to the radio frequency receiver, the controller being structured to:
  - determine, for each reference signal occurrence, a ratio of a largest peak to a mean of a plurality of other peaks in that reference signal occurrence;
  - select a minimum ratio;
  - based on the ratio, classify a channel type as one of (a) a delay-spread channel type, and (b) a non-delay-spread channel type;
  - select a time of arrival generator based on the channel type; and
  - estimate the time of arrival information using the selected time of arrival generator.

10. The apparatus of claim 9, wherein the plurality of other peaks is determined by correlation of the received wireless signal with the reference signal.

11. The apparatus of claim 9, wherein the controller is structured to select a first time of arrival generator if the ratio is not beyond a desired threshold.

12. The apparatus of claim 11, wherein the controller is structured to sum peaks from multiple occasions to form a multi-occasion correlation, and estimate the time of arrival information based on the multi-occasion correlation.

13. The apparatus of claim 9, wherein the controller is structured to select a second time of arrival generator if the ratio is beyond a desired threshold.

14. The apparatus of claim 13, wherein the controller is structured to estimate a plurality of individual time of arrival estimates, each corresponding to the plurality of peaks from a measurement occasion, and estimating the time of arrival information based on the mean of the plurality of individual time of arrival estimates.

15. The apparatus of claim 9, wherein the reference signal comprises a positioning reference symbol.

16. The apparatus of claim 9, wherein a second controller is structured to triangulate a physical position associated with the apparatus based on the time of arrival information.

17. A method of estimating time of arrival information associated with a wireless signal, the method comprising:
- classifying a channel as one of (a) a delay-spread channel, and (b) a non-delay-spread channel based on multiple occurrences of a positioning reference symbol from a plurality of antennas by determining a ratio of a first peak to a mean of a plurality of peaks, wherein the first peak is larger than each of the plurality of peaks, and the ratio is a minimum ratio selected from a plurality of ratios;
- if the ratio is not beyond a desired threshold, estimating the time of arrival information by summing each peak that occurs at a common time offset in the plurality of peaks from multiple occasions to form a multi-occasion correlation, and estimating the time of arrival information based on the multi-occasion correlation; and
- if the ratio is beyond the desired threshold, estimating the time of arrival information by estimating a plurality of individual time of arrival estimates, each corresponding to the plurality of peaks from one occasion, and estimating the time of arrival information based on the mean of the plurality of individual time of arrival estimates.

* * * * *